(12) United States Patent
Paikowsky et al.

(10) Patent No.: US 9,104,730 B2
(45) Date of Patent: Aug. 11, 2015

(54) INDEXING AND RETRIEVAL OF STRUCTURED DOCUMENTS

(75) Inventors: Oren Paikowsky, Jerusalem (IL); Shimon Stark, Makkabbim (IL); Yariv Tzaban, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/493,836

(22) Filed: Jun. 11, 2012

(65) Prior Publication Data

US 2013/0332437 A1    Dec. 12, 2013

(51) Int. Cl.
*G06F 17/30*    (2006.01)

(52) U.S. Cl.
CPC ...... *G06F 17/30477* (2013.01); *G06F 17/3043* (2013.01); *G06F 17/30436* (2013.01); *G06F 17/30911* (2013.01); *G06F 17/30929* (2013.01)

(58) Field of Classification Search
None
See application file for complete search history.

(56) References Cited

U.S. PATENT DOCUMENTS

| | | | |
|---|---|---|---|
| 7,756,858 B2 * | 7/2010 | Lindblad et al. | 707/716 |
| 7,895,190 B2 * | 2/2011 | Joseph | 707/715 |
| 7,895,232 B2 | 2/2011 | Sznajder et al. | |
| 8,117,182 B2 | 2/2012 | Beyer et al. | |
| 2004/0193607 A1 | 9/2004 | Kudo et al. | |
| 2005/0050086 A1 | 3/2005 | Liu et al. | |
| 2007/0033165 A1 | 2/2007 | Sheinwald et al. | |
| 2007/0168363 A1 | 7/2007 | Inaba et al. | |
| 2008/0010313 A1 | 1/2008 | Thede | |
| 2009/0125480 A1 * | 5/2009 | Zhang et al. | 707/2 |
| 2010/0185683 A1 | 7/2010 | Baby et al. | |
| 2010/0228734 A1 * | 9/2010 | Murthy | 707/741 |
| 2010/0250551 A1 * | 9/2010 | Kamimura et al. | 707/741 |
| 2012/0047186 A1 * | 2/2012 | Shadmon et al. | 707/803 |
| 2012/0124030 A1 * | 5/2012 | Seetharama et al. | 707/716 |
| 2013/0332483 A1 | 12/2013 | Paikowsky | |
| 2014/0089277 A1 * | 3/2014 | Qiu et al. | 707/693 |

FOREIGN PATENT DOCUMENTS

CN     1581172     2/2005

OTHER PUBLICATIONS

Li et al., "QTPI: a Quick Terse Path Index for XML Keyword Search", 2nd International Conference on Computer Engineering and Technology (ICCET), IEEE, 2010.
International Search Report and Written Opinion dated Oct. 3, 2013, 9 pages.

* cited by examiner

*Primary Examiner* — Belix M Ortiz Ditren
(74) *Attorney, Agent, or Firm* — Joe Polimeni; Edell, Shapiro & Finnan, LLC

(57) ABSTRACT

Facilitating the searching of structured documents by identifying multiple element paths corresponding to multiple elements included in multiple structured documents, and for each of the element paths providing, for inclusion in a first searchable data structure, the element path exclusive of a value of the element corresponding to the element path and exclusive of an identifier of the structured document including the element corresponding to the element path, and providing, for inclusion in a second searchable data structure, the element path in association with a value of the element corresponding to the element path and in association with an identifier of the structured document including the element corresponding to the element path.

12 Claims, 7 Drawing Sheets

A.XML:
```
<person>
    <name>John Doe</name>
    <address>15 Baker St.</address>
    <phone_no>12345</phone_no>
    <phone_no>12345</phone_no>
    <phone_no>67890</phone_no>
</person>
```

B.XML:
```xml
<person>
    <name>Jane Doe</name>
    <address>28 Abby Rd.</address>
    <phone_no>102938</phone_no>
    <email>jane@doe.com</email>
</person>
```

Fig. 2B

B.XSD:
```xml
<xs:schema xmlns:xs="http://www.w3.org/2001/XMLSchema">
    <xs:element name="person">
        <xs:complexType>
            <xs:sequence>
                <xs:element name="name" minOccurs="1" maxOccurs="1"/>
                <xs:element name="address" minOccurs="1" maxOccurs="1"/>
                <xs:element name="phone_no" minOccurs="1" maxOccurs="1"/>
                <xs:element name="email" minOccurs="1" maxOccurs="1"/>
            </xs:sequence>
        </xs:complexType>
    </xs:element>
</xs:schema>
```

Fig. 2D

A.XSD U B.XSD:
```
<xs:schema xmlns:xs="http://www.w3.org/2001/XMLSchema">
   <xs:element name="person">
      <xs:complexType>
         <xs:sequence>
            <xs:element name="name" minOccurs="1" maxOccurs="1"/>
            <xs:element name="address" minOccurs="1" maxOccurs="1"/>
            <xs:element name="phone_no" minOccurs="1" maxOccurs="2"/>
            <xs:element name="email" minOccurs="0" maxOccurs="1"/>
         </xs:sequence>
      </xs:complexType>
   </xs:element>
</xs:schema>
```

Fig. 2E

A.XML
| | | |
|---|---|---|
| '/person[1]' | '' | 'A.XML' |
| '/person[1]/name[1]' | 'John Doe' | 'A.XML' |
| '/person[1]/address[1]' | '15 Baker St.' | 'A.XML' |
| '/person[1]/phone_no[1]' | '12345' | 'A.XML' |
| '/person[1]/phone_no[2]' | '67890' | 'A.XML' |

B.XML
| | | |
|---|---|---|
| '/person[1]' | '' | 'B.XML' |
| '/person[1]/name[1]' | 'Jane Doe' | 'B.XML' |
| '/person[1]/address[1]' | '28 Abby Rd.' | 'B.XML' |
| '/person[1]/phone_no[1]' | '102938' | 'B.XML' |
| '/person[1]/email[1]' | 'jane@doe.com' | 'B.XML' |

Fig. 2F

| User's Search Query | Query Element Paths | Element Path Results | Query of Element Path Associations | Associated Documents |
|---|---|---|---|---|
| contains('/person/name', 'Doe') | /person/name | /person[1]/name[1] | '/person[1]/name[1]' , 'Doe' | A.XML, B.XML |
| contains('/person/email', 'com') | /person/email | /person[1]/email[1] | '/person[1]/email[1]' , 'com' | B.XML |
| contains('/person/phone_no', '0') | /person/phone_no, /person/phone_no | /person[1]/phone_no[1] /person[1]/phone_no[2] | ( '/person[1]/phone_no[1]' , '0' ) OR ( '/person[1]/phone_no[2]' , '0' ) | A.XML, B.XML |
| contains('//address', 'Baker') | .//address | /person[1]/address[1] | '/person[1]/address[1]' , 'Baker' | A.XML |

INDEXING AND RETRIEVAL OF STRUCTURED DOCUMENTS

FIELD OF THE INVENTION

The present invention relates to indexing and retrieval of computer-readable documents in general, and more particularly to indexing and retrieval of structured documents.

BACKGROUND OF THE INVENTION

Structured documents are commonly used for storing information on computer-based storage media, where such documents use embedded coding, such as a markup language like the HyperText Markup Language (HTML) or the Extensible Markup Language (XML), to give document contents various structural meanings according to a schema. Structured documents are typically indexed by computer-based search engines in the same manner as unstructured documents that do not employ such embedded coding. Such search engines are often employed using conventional techniques to identify structured documents that contain a particular value, whereupon the identified structured documents are parsed to determine which of the identified structured documents include the value in a particular structural context. However, this approach is often slow and inefficient.

SUMMARY OF THE INVENTION

In one aspect of the invention a method is provided for facilitating the searching of structured documents, the method including identifying multiple element paths corresponding to multiple elements included in multiple structured documents, and for each of the element paths providing, for inclusion in a first searchable data structure, the element path exclusive of a value of the element corresponding to the element path and exclusive of an identifier of the structured document including the element corresponding to the element path, and providing, for inclusion in a second searchable data structure, the element path in association with a value of the element corresponding to the element path and in association with an identifier of the structured document including the element corresponding to the element path.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIGS. 2A-2F are exemplary structured documents and schema illustrating aspects of the system of FIG. 1, operative in accordance with an embodiment of the invention;

FIG. 2G is an exemplary table of search queries and results illustrating aspects of the system of FIG. 1, operative in accordance with an embodiment of the invention;

DETAILED DESCRIPTION OF THE INVENTION

Figure 1:
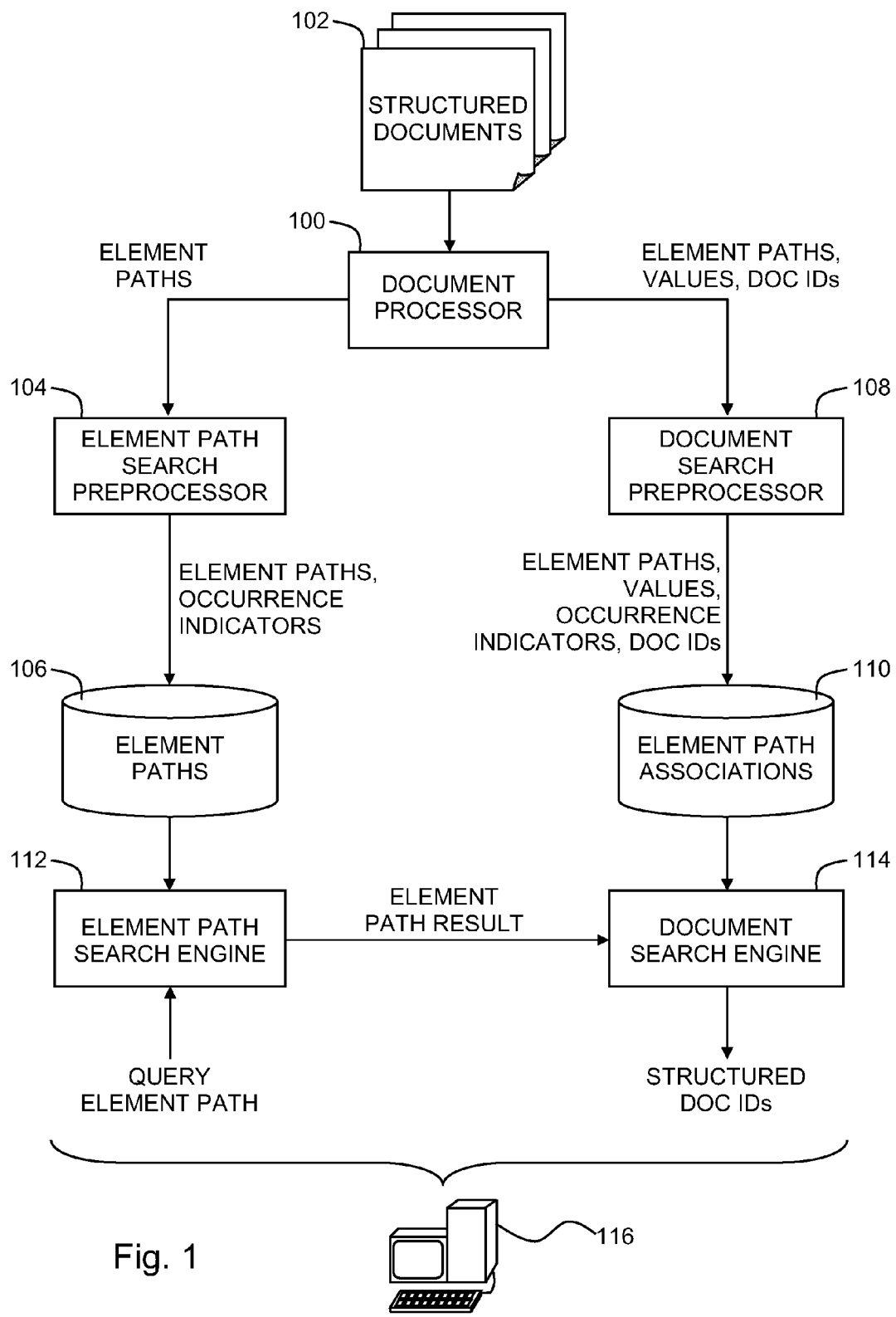
FIG. 1 is a simplified conceptual illustration of a system for facilitating the searching of structured documents, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for facilitating the searching of structured documents, constructed and operative in accordance with an embodiment of the invention. In the system of FIG. 1, a document processor 100 is configured to identify one or more element paths in one or more structured documents 102, such as Extensible Markup Language (XML) documents. Each element path in a structured document typically corresponds to an element within the structured document. For example, in a structured document that includes the following XML description of a phone book entry

```
<person>
    <name>John Doe</name>
    <address>15 Baker St.</address>
    <phone_no>12345</phone_no>
    <phone_no>67890</phone_no>
</person>
``` document processor 100 identifies the element path '/person/name' as corresponding to the element 'name' and having the value 'John Doe'.

An element path search preprocessor 104 is configured to provide each of the element paths identified by document processor 100 for inclusion in a searchable data structure of element paths 106, where element paths 106 may, for example, be an index, table, database, or a searchable structured document, such as an XML-based document that is searchable using the XML Path Language (XPath) and related tools. Preferably, each element path provided by element path search preprocessor 104 for inclusion in element paths 106 is provided exclusive of a value of the element corresponding to the element path and exclusive of an identifier of the structured document including the element corresponding to the element path.

A document search preprocessor 108 is configured to provide each of the element paths for inclusion in a searchable data structure of element path associations 110, where element path associations 110 may, for example, be an index, table, database, or any type of data structure that may be searched using conventional search engine technology. Preferably, each element path provided by document search preprocessor 108 for inclusion in element path associations 110 is provided in association with a value of the element corresponding to the element path and in association with an identifier of the structured document including the element corresponding to the element path. Document search preprocessor 108 may also provide for inclusion in element path associations 110 portions of the element paths in association with an identifier of the structured document including the element path portion. When providing an element path or portion thereof for inclusion in element path associations 110, document search preprocessor 108 preferably includes an occurrence indicator within the element path or portion indicating that the element path or portion appears more than once within any of structured documents 102.

An exemplary method of operation of document processor 100, element path search preprocessor 104, and document search preprocessor 108 is described hereinbelow with additional reference to FIGS. 2A-2F.

An element path search engine 112 is configured to search element paths 106 using a query element path, such as may be provided by a computer user as part of a query, and produce a search result, now referred to as an element path result. Element path search engine 112 is preferably configured to include occurrence indicators within the element path result indicating where any portion of the query element path appears more than once within any of structured documents 102.

A document search engine 114 is configured to search element path associations 110 using the element path result, with or without a query element value such as may be provided by a computer user, thereby identifying any of structured documents 102 that are associated with the element path result/query element value.

An exemplary method of operation of element path search engine 112 and document search engine 114 is described hereinbelow with additional reference to FIG. 2G.

Any of the elements shown in FIG. 1 are preferably implemented by one or more computers, such as a computer 116, in computer hardware and/or in computer software embodied in a non-transient, computer-readable medium in accordance with conventional techniques.

Figures 2A, 2C:

Additional reference is now made to FIGS. 2A-2F which illustrate an exemplary method of operation of document processor 100, element path search preprocessor 104, and document search preprocessor 108 of the system of FIG. 1. In FIG. 2A a structured document titled "A.XML" is shown, and in FIG. 2B a structured document titled "B.XML" is shown. Document processor 100 identifies element paths in A.XML and B.XML. A schema titled A.XSD describing A.XML as shown in FIG. 2C is preferably generated by element path search preprocessor 104, where the element paths of A.XML are represented in A.XSD together with a minimum occurrence indicator 200 and a maximum occurrence indicator 202. Each element path in A.XML is represented only once in A.XSD, while minimum occurrence indicator 200 and maximum occurrence indicator 202 indicate the number of times each element path having a unique value occurs in A.XML. The element path '/person/name' occurs only once in A.XML, and is represented only once in A.XSD together with a minimum occurrence indicator whose value is 1 and a maximum occurrence indicator whose value is also 1. The element path '/person/phone_no' occurs three times in A.XML for two unique values of '12345' and '67890', and is represented only once in A.XSD together with a minimum occurrence indicator whose value is 2 and a maximum occurrence indicator whose value is also 2. A schema titled B.XSD describing B.XML as shown in FIG. 2D is likewise preferably generated by element path search preprocessor 104.

The element paths in structured documents 102 are provided by element path search preprocessor 104 for inclusion in element paths 106, such as where element paths 106 is a unified schema that describes multiple structured documents. Thus, a union of A.XSD and B.XSD as shown in FIG. 2E is preferably generated by element path search preprocessor 104, where each of the element paths in each of the structured documents are represented once in the unified schema together with a minimum occurrence indicator indicating the least number of occurrences of the element path in any of the structured documents and a maximum occurrence indicator indicating the greatest number of occurrences of the element path in any of the structured documents. Thus, as the element path '/person/email' is not found in A.XML and appears once in B.XML, it is represented once in in the unified schema together with a minimum occurrence indicator whose value is 0 and a maximum occurrence indicator whose value is 1. As the element '/person/phone_no' appears twice in A.XML with a unique value and appears once in B.XML, it is represented once in in the unified schema together with a minimum occurrence indicator whose value is 1 and a maximum occurrence indicator whose value is 2.

The element paths in structured documents 102 are provided by document search preprocessor 108 for inclusion in element path associations 110, such as is shown in FIG. 2F. Document search preprocessor 108 preferably provides the element paths and portions together with occurrence indicators, element values where applicable, and identifiers of associated structured documents. Thus, for A.XML and B.XML in FIGS. 2A and 2B, '/person/name' is provided in FIG. 2F as '/person[1]/name[1]' 'John Doe' 'A.XML'
'/person[1]/name[1]' 'Jane Doe' 'B.XML'
'/person' is provided as
   '/person[1]' 'A.XML'
   '/person[1]' 'B.XML'
and '/person/phone_no' is provided as
   '/person[1]/ phone_no [1]' '12345' 'A.XML'
   '/person[1]/ phone_no [2]' '67890' 'A.XML'
   '/person[1]/ phone_no [1]' '102938' 'B.XML'.

Additional reference is now made to FIG. 2G which illustrates an exemplary method of operation of element path search engine 112 and document search engine 114 of the system of FIG. 1. In FIG. 2G a table of exemplary search queries and results is shown, where column 204 shows user's queries, from which element path search engine 112 derives query element paths shown in column 206. Element path search engine 112 searches element paths 106 using the query element paths in column 206 to produce element path results shown in column 208, where the element path results include occurrence indicators derived from element paths 106. Document search engine 114 uses the element path results, together with any element values specified in the original queries in column 204, to formulate the queries shown in column 210 which document search engine 114 uses to search element path associations 110, thereby identifying any of structured documents 102 that are associated with the element path result/query element value, the results of which search are shown in column 212.

Figure 3:
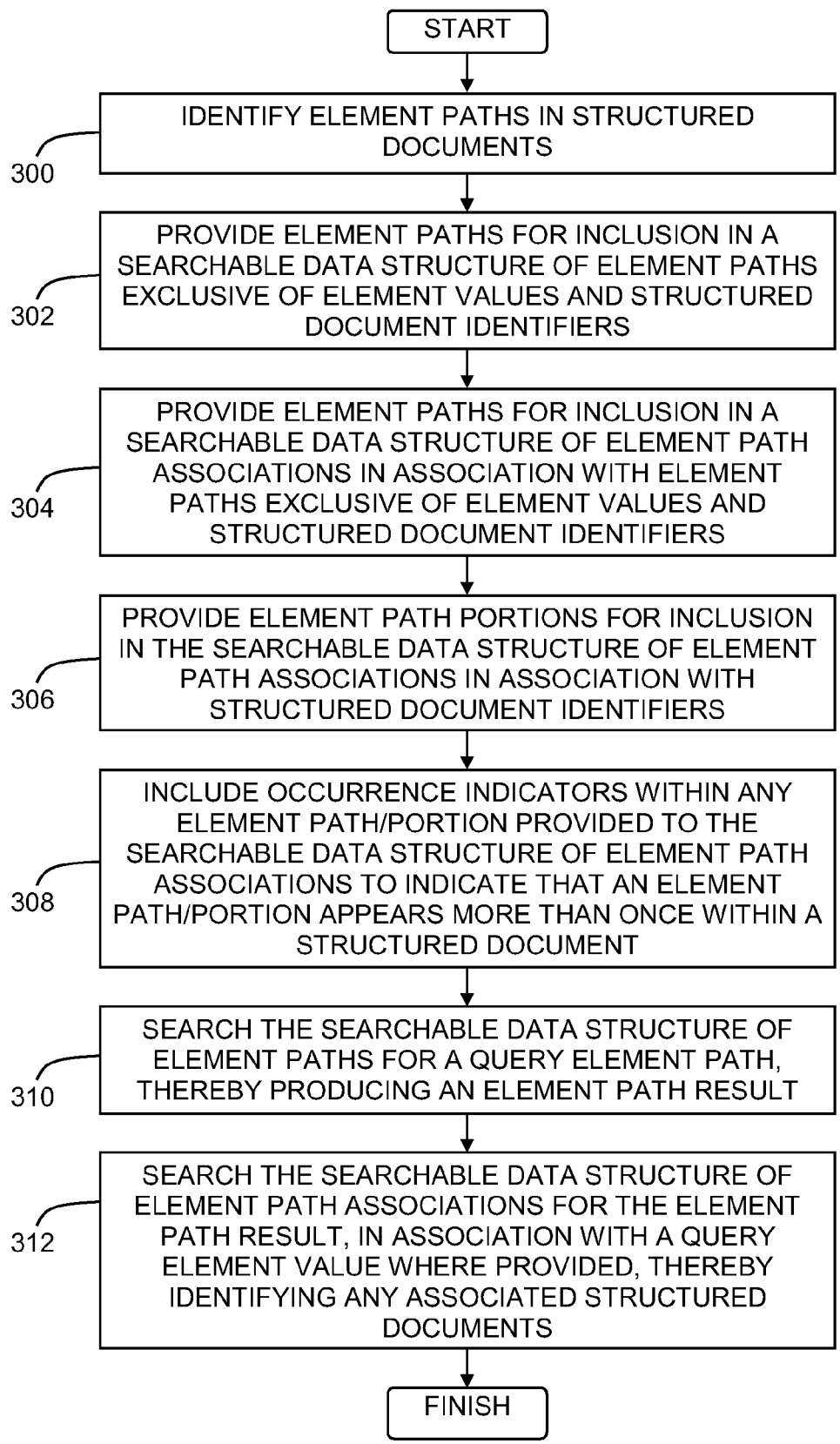
FIG. 3 is a simplified flowchart illustration of an exemplary method of operation of the system of FIG. 1, operative in accordance with an embodiment of the invention.

Reference is now made to FIG. 3, which is a simplified flowchart illustration of an exemplary method of operation of the system of FIG. 1, operative in accordance with an embodiment of the invention. In the method of FIG. 3 one or more element paths are identified in one or more structured documents (step 300). Each of the element paths is provided for inclusion in a searchable data structure of element paths exclusive of a value of the element corresponding to the element path and exclusive of an identifier of the structured document including the element corresponding to the element path (step 302). Each of the element paths is also provided for inclusion in a searchable data structure of element path associations in association with a value of the element corresponding to the element path and in association with an identifier of the structured document including the element corresponding to the element path (step 304). Portions of the elements paths may also be provided for inclusion in the searchable data structure of element path associations, where each portion is provided in association with an identifier of the structured document including the element path portion (step 306). An occurrence indicator may be included within any element path or portion provided to the searchable data structure of element path associations, where the occurrence indicator indicates that the element path or portion appears more than once within any of the structured documents (step 308). The searchable data structure of element paths is searched for a query element path, thereby producing an element path result (step 310). The searchable data structure of element path associations is searched for the element path result, in association with a query element value where provided, thereby identifying any associated structured documents (step 312).

Figure 4:
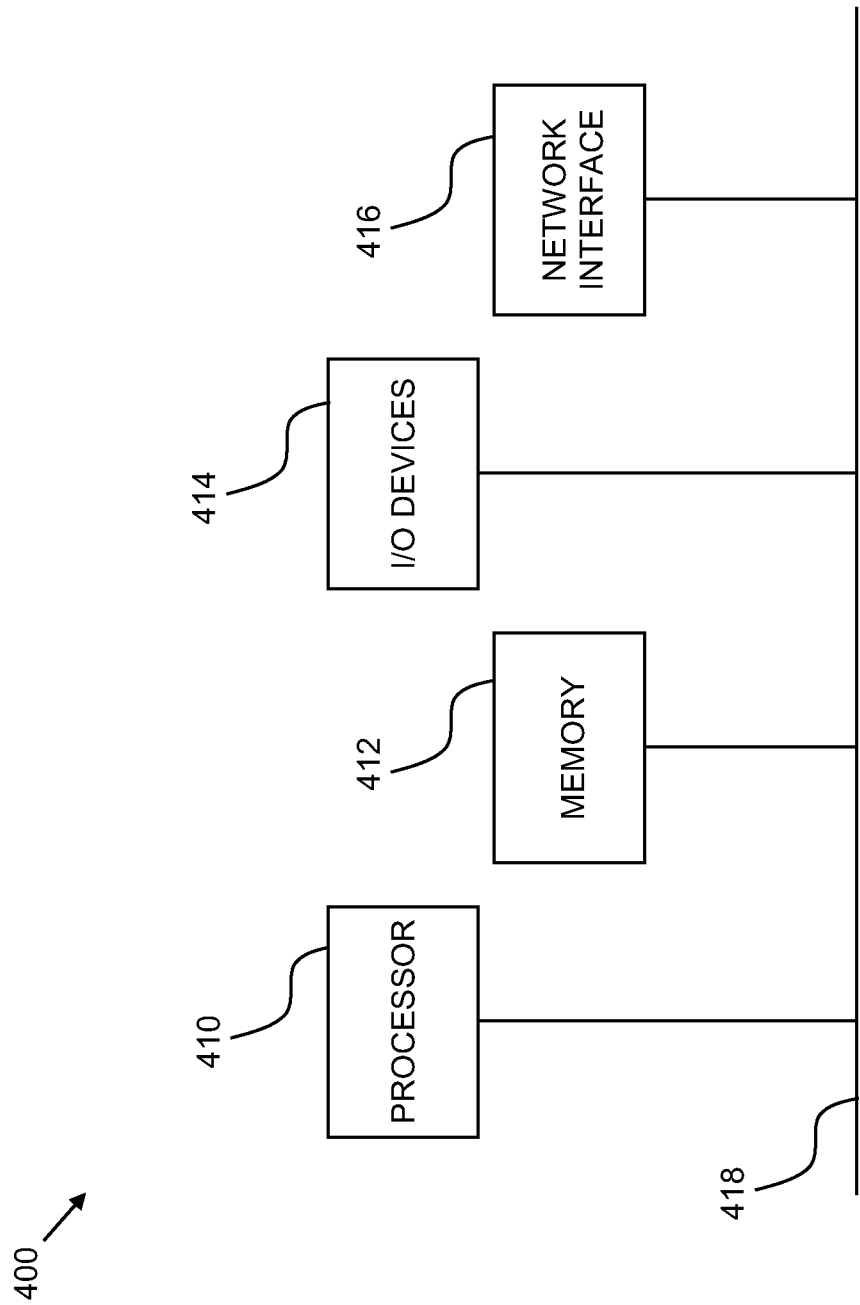
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for facilitating the searching of structured documents, the system comprising:
   a document processor configured to identify a plurality of element paths corresponding to a plurality of elements included in a plurality of structured documents;
   an element path search preprocessor configured to provide each of the element paths for inclusion in a first searchable data structure, wherein for each of the element paths the element path search preprocessor is configured to provide the element path exclusive of a value of the element corresponding to the element path and exclusive of an identifier of the structured document including the element corresponding to the element path;
   a document search preprocessor configured to provide each of the element paths for inclusion in a second searchable data structure, wherein for each of the element paths the document search preprocessor is configured to provide the element path in association with a value of the element corresponding to the element path and in association with an identifier of the structured document including the element corresponding to the element path;
   an element path search engine configured to search the first searchable data structure for a query element path in response to a first query, thereby producing an element path result; and
   a document search engine configured to determine a second query by combining the element path result with one or more elements of the first query and search the second searchable data structure for the element path result based on the second query, thereby identifying any of the structured documents associated with the element path result.

2. The system according to claim 1 wherein the element path search preprocessor is configured to create the first searchable data structure by generating a unified schema that describes each of the structured documents.

3. The system according to claim 2 wherein the element path search preprocessor is configured to represent only once in the unified schema any of the element paths that appear in more than one of the structured documents.

4. The system according to claim 2 wherein the element path search preprocessor is configured to represent any of the element paths in the unified schema together with:
   a minimum occurrence indicator indicating the least number of occurrences of the element path in any of the structured documents; and
   a maximum occurrence indicator indicating the greatest number of occurrences of the element path in any of the structured documents.

5. The system according to claim 1 wherein the element path search engine is configured to indicate within the element path result an order of occurrence of any portion of the element path that appears more than once within any of the structured documents.

6. The system according to claim 1 wherein the document search engine is further configured to search the second searchable data structure for the element path result in association with an element value of the first query, thereby identifying any of the structured documents associated with the element path result and element value.

7. A computer program product for facilitating the searching of structured documents, the computer program product comprising:
   a non-transitory computer-readable storage medium; and
   computer-readable program code embodied in the non-transitory computer-readable storage medium, wherein the computer-readable program code is configured to:
      identify a plurality of element paths corresponding to a plurality of elements included in a plurality of structured documents;
      provide each of the element paths for inclusion in a first searchable data structure, wherein each element path is provided exclusive of a value of the element corresponding to the element path and exclusive of an identifier of the structured document including the element corresponding to the element path;
      provide each of the element paths for inclusion in a second searchable data structure, wherein each element path is provided in association with a value of the element corresponding to the element path and in association with an identifier of the structured document including the element corresponding to the element path;

search the first searchable data structure for a query element path in response to a first query, thereby producing an element path result; and determine a second query by combining the element path result with one or more elements of the first query and search the second searchable data structure for the element path result based on the second query, thereby identifying any of the structured documents associated with the element path result.

8. The computer program product according to claim 7 wherein the computer-readable program code is configured to indicate within any of the element paths an order of occurrence of any portion of the element path that appears more than once within any of the structured documents.

9. The computer program product according to claim 7 wherein the computer-readable program code is configured to create the first searchable data structure by generating a unified schema that describes each of the structured documents.

10. The computer program product according to claim 9 wherein the computer-readable program code is configured to represent only once in the unified schema any of the element paths that appear in more than one of the structured documents, and wherein the computer-readable program code is configured to represent any of the element paths in the unified schema together with:

a minimum occurrence indicator indicating the least number of occurrences of the element path in any of the structured documents; and a maximum occurrence indicator indicating the greatest number of occurrences of the element path in any of the structured documents.

11. The computer program product according to claim 7 wherein the computer-readable program code is configured to indicate within the element path result an order of occurrence of any portion of the element path that appears more than once within any of the structured documents.

12. The computer program product according to claim 7 wherein the computer-readable program code is further configured to search the second searchable data structure for the element path result in association with an element value of the first query, thereby identifying any of the structured documents associated with the element path result and element value.

\* \* \* \* \*